United States Patent Office 3,260,741
Patented July 12, 1966

3,260,741
SULFOXIDATION PROCESS
John Mackinnon, Menlo Park, and Adolph A. Austin, Colonia, N.J., assignors to Esso Research and Engineering Company, a corporation of Delaware
No Drawing. Filed Nov. 9, 1962, Ser. No. 236,699
3 Claims. (Cl. 260—513)

The present invention relates to an improved method for the preparation of sulfonic acids and more particularly to the preparation of sulfonic acids from non-aromatic compounds by reaction with sulfur dioxide and oxygen.

Aliphatic sulfonic acids have heretofore been made from paraffins by reaction with sulfur dioxide and oxygen. The reaction can be initiated by means of ultraviolet light, high energy ionizing radiation or chemicals, such as azo compounds. Of the foregoing initiators, ionizing radiation has been found to be very effective for the sulfoxidation reaction. After the initial "inertia" of the reacting system has been overcome, the reaction proceeds quite readily in the absence of further initiation or radiation and relatively high conversions are obtained. This phenomenon is sometimes called a self-sustaining reaction. That is, it is a reaction which will proceed without externally applied stimulation or catalysts normally used for the purpose of creating chain initiators.

It has been noted that when the sulfoxidation reaction is effected with an organic feed having a relatively low affinity or solubility for sulfur dioxide the reaction product has an objectionable color, usually ranging from dark yellow to black. Because the sulfonates prepared by the sulfoxidation process have utility in household detergents and other cleaning compositions in which color is an important characteristic, it is important to eliminate or at least reduce the color often found in sulfonated hydrocarbons in the detergent molecular weight range made by the sulfoxidation method. The present process avoids this color problem by maintaining the concentration of sulfur dioxide in the reaction mixture at a sufficiently high level to prevent any significant color formation in the reaction mixture until the reaction is quenched with a suitable agent, such as water or aqueous methanol. Once the persulfonic acid reaction product has been reduced or quenched, the sulfur dioxide can be removed from the mixture by any satisfactory means, such as flashing or distillation.

The essence of the invention resides in the discovery that in the absence of excess sulfur dioxide the reaction mixture, even though it has been transferred out of the reaction vessel, will become discolored. This problem is particularly acute where the feed consists mainly of molecules containing 12 or more carbon atoms. While similar results are obtained with lower hydrocarbons, for example $C_8$ and $C_{10}$ paraffins, the color is usually less noticeable, especially when the reaction mixture is quenched soon after it is withdrawn from the reactor. Therefore, the invention has its greatest application to higher molecular weight hydrocarbon feeds, e.g., substantially straight chain saturated $C_{12}$ to $C_{24}$ hydrocarbons. While the feeds may contain some molecules having as many as 30 carbon atoms per molecule, compounds having more than 24 carbon atoms are generally not very useful as detergents, and therefore are less valuable although they may have other uses, such as water thickeners. It is not intended to limit the invention to hydrocarbon feeds in the intermediate molecular weight range, because the process can be carried out with substantially any hydrocarbon feed, including high polymers, such as polyethylene, and paraffin waxes. Rather, the foregoing statements are merely intended to emphasize that the principal commercial utility for the process is in the detergent field.

The type of feed used in the reaction is not critical, although the results are more pronounced with heavier feeds, since the invention relates to the prevention of color formation in substantially any sulfoxidation process in which the reaction mixture has an insufficient affinity for the sulfur dioxide reactant. The liquid organic feed, e.g. $C_4$–$C_{32}$ hydrocarbons should of course be substantially free of any chemical groups that would interfere with the sulfoxidation reaction. The most convenient, and therefore the preferred feed, consists of saturated straight chain hydrocarbons, such as n-dodecane, n-pentadecane, n-octadecane, n-eicosane or n-docosane. Because sufficient quantities of these normal alkanes are not always available, it is often necessary to utilize feeds containing some branched chain paraffins. Feeds containing tertiary or quaternary carbon atoms are objectionable unless the reaction is in a self-sustained state. Thus, when the words "substantially straight chain" are hereinafter used to describe feeds, they are intended to mean that the feed comprises substances that are essentially free of compounds containing such carbon atoms, i.e. contain less than 10 mole percent, preferably less than 5 mole percent of such compounds.

Other feeds that can be used in the sulfoxidation reaction are higher molecular weight paraffins such as n-tetracosane and n-triacontaine; and cycloparaffins, such as cyclododecane, cyclohexane and cyclooctane. Mono-olefins above about $C_{10}$, such as dodecene-1, octadecene-1, and polymers, for example polyethylene, etc. can be used although unsaturation to some extent inhibits the reaction.

The oxygen and sulfur dioxide reactants are preferably anhydrous, although small amounts, e.g. up to 200 p.p.m. of water can be tolerated. The aforementioned reactants are generally introduced into the reaction zone in the form of essentially pure chemicals. Sometimes, particularly in the case of oxygen, an inert diluent, such as nitrogen, is employed. For example, air can be utilized as a source of molecular oxygen for the reaction. Other substances that contain free oxygen or are capable of producing oxygen under the reaction conditions can be used in the process.

The organic feed is generally introduced in the reaction zone first, followed by the inorganic reactants which are usually bubbled through the feed. The molar ratio of molecular oxygen to sulfur dioxide in the reaction zone is preferably about 1:5 to 1:10. In order to avoid discoloration while the mixture is in the reaction zone the molar ratio of oxygen to sulfur dioxide should be at least 1:2. If desired, large excesses of sulfur dioxide can be employed, e.g., molar ratios of sulfur dioxide to oxygen greater than 10:1, but this is usually unnecessary to obtain a substantially colorless product.

The quantity of sulfur dioxide and oxygen used in carrying out the reaction will vary with the desired conversion. Often the reaction is effected under conditions such that about 10 to 15% of the organic feed is sulfoxidized per pass. It is possible, however, to operate the process at a much lower conversion, e.g., 5% or a greater conversion, i.e. up to 50%. For most organic feeds, the molar ratio of oxygen to feed can be in the range 0.1:1 to 10:1; preferably 0.5:1 to 3:1, e.g. 1:1.

The sulfoxidation reaction is usually effected at temperatures that are about 10° to 50° F. above the melting point of the feed. Suitable reaction temperatures for the $C_{12}$ to $C_{24}$ hydrocarbons are between about 70° F. and 150° F. Any temperature up to about 200° F. can be employed provided there is excess sulfur dioxide present in the liquid phase. The residence time depends on the conversion and other factors. In most reactions, the reactants will be in the reaction zone under reacting conditions for from several minutes to an hour or two hours. A suitable residence time for a continuous reaction which is carried out at pressures of 40 to 80 p.s.i.g. and temperatures of 110° to 130° F. is about 7 to 60 minutes.

The process in which the invention is most useful is one in which the reaction is self-sustained and is carried out under superatmospheric pressure, e.g. above 20 p.s.i.g. In preparing sulfonic acids from detergent range straight chain paraffins, it has been found that the reaction can be effected in a self-sustained manner, i.e. no initiator is needed to continue the reaction for a substantial period of time, by using pressures of the order of 40 to 100 p.s.i.g. If pressure vessels are available, even higher pressures can be used, e.g. up to 200 or 300 p.s.i.g. When superatmospheric pressure is used in the reaction zone, the conventional procedure is to release the pressure before quenching the reaction mixture thereby letting some of the sulfur dioxide escape. In carrying out the preferred embodiment of the present invention, the reaction mixture is kept under sufficient pressure to prevent the formation of color bodies until the quench has been effected. Once the reaction ceases, the pressure can be reduced to atmospheric pressure. The pressure that must be maintained will vary with the characteristics of the feed and other conditions, such as temperature, which affect the solubility of sulfur dioxide in the mixture.

In lieu of keeping the reaction mixture under pressure, the mixture can be cooled to a temperature at which the concentration of sulfur dioxide necessary to substantially reduce color formation can be maintained. For instance, the reaction mixture can be chilled to below 60° F., quenched with water and stripped of unreacted sulfur dioxide. For hydrocarbon feeds containing about 14 to 20 carbon atoms per molecule, the reaction mixture should be lowered to about 50° to 105° F. and kept there until the quench is complete. Care must be taken not to gel the mixture by cooling it too low.

It is believed that the sulfoxidation reaction is started by the formation of free radicals in the hydrocarbon feed stock. These radicals then react with sulfur dioxide and oxygen to form peroxysulfonic acids, sometimes called persulfonic acids. The persulfonic acids are converted to sulfonic acids by further reaction with water and sulfur dioxide. As mentioned above, any suitable free radical generating means, such as gamma rays, can be used to initiate the chain reaction which is illustrated by the following equations:

(1) $RH \rightarrow R\cdot + H\cdot$
(2) $R\cdot + SO_2 \rightarrow RSO_2\cdot$
(3) $RSO_2\cdot + O_2 \rightarrow RSO_2O_2\cdot$
(4) $RSO_2O_2\cdot + RH \rightarrow RSO_2O_2H + R\cdot$
(5) $RSO_2O_2H + H_2O + SO_2 \rightarrow RSO_3H + H_2SO_4$
(6) $RSO_2O_2H \rightarrow RSO_2O\cdot + OH\cdot$
(7) $OH\cdot + RH \rightarrow H_2O + R\cdot$
(8) $RSO_2O + RH \rightarrow RSO_3H + R\cdot$
(9) $H_2SO_4 + xH_2O \rightarrow H_2SO_4\cdot(H_2O)_x$

OVER-ALL REACTION $$RH + SO_2 + \tfrac{1}{2}O_2 \rightarrow RSO_3H$$

In order to stop discoloration of the product, it is best to keep the sulfur dioxide concentration in the reacting mass equal to at least 1 mole per mole of persulfonic acid. This can be accomplished by (a) adding a hydrocarbon in which $SO_2$ is fairly soluble, (b) using substantial pressures to keep the $SO_2$ in solution, (c) adding a large excess of $SO_2$ to the reaction mixture prior to or just after withdrawing it from the reaction vessel, or (d) reducing the temperature of the reaction mixture. The last named procedure is not very satisfactory when the feed has a high melting point, e.g. 70° F. The simplest and the most effective way of helping the sulfur dioxide concentration at the proper level is to keep the pressure well above atmospheric pressure until the persulfonic acids have been quenched, i.e. reduced to sulfonic acids. If a lower molecular weight saturated hydrocarbon is used as a solvent for $SO_2$, e.g., n-hexane or cycloheptane, it is advisable to shut off the oxygen supply first in order to avoid any substantial reaction with the solvent.

In accordance with one embodiment of this invention, a two liter agitated pressure vessel is filled with 440 cc. of n-cetane and gaseous sulfur dioxide and oxygen are introduced into the bottom of the vessel with additional feed at the following rates:

| | Cc./minute |
|---|---|
| Sulfur dioxide | 2,250 |
| Oxygen | 450 |
| n-Cetane | 29 |

The liquid reaction mixture is maintained under a pressure of 40 to 80 p.s.i.g. and a temperature between 100° and 125° F. and is efficiently stirred to insure good contact between the gases and the liquid hydrocarbon. The atmosphere above the liquid consists essentially of $SO_2$. The reactants remain in the vessels for about 15 to 16 minutes and a part of the mixture is continuously drawn off at the rate of 29 cc. per minute. The reactor effluent which consists mainly of persulfonic acid, unreacted hydrocarbon and dissolved sulfur dioxide is kept under substantially the same pressure until it is mixed with the quenching or reducing agent, which in most cases is water or an aqueous alcohol solution, e.g. 50 vol. percent methanol, at temperatures of 110° to 125° F. Thereafter the mixture is depressurized to substantially atmospheric and the unreacted sulfur dioxide is vented. If the conversion is low, the amount of water needed to take care of the persulfonic acids in the liquid part of the reaction mixture will be about 5 to 20 volume percent of the mixture. Following the water quench and depressuring, the sulfonic acid product is separated from the unreacted hydrocarbon and the latter is recycled to the reaction zone.

In another embodiment of the invention, the liquid portion of the reaction mixture in the above described embodiment is diluted with a large volume of sulfur dioxide, e.g. 100 cc., and the withdrawn reaction mixture is rapidly reduced to atmospheric pressure and then quickly quenched with up to 20 vol. percent water. The excess sulfur dioxide keeps the concentration of that chemical at a sufficiently high level to prevent discoloration.

In still another embodiment, the oxygen supply is shut off in the first mentioned embodiment and about 50 to 100 cc. of n-hexane, or other low molecular weight liquid hydrocarbon, is added to the reaction mixture which is then withdrawn from the reaction zone, depressurized and quenched in the manner described above.

The foregoing embodiments illustrate the various methods that can be employed to keep the amount of sulfur dioxide in the liquid reaction mass at the level which is necessary to avoid excessive color formation.

The alkali metal salts, especially the sodium salts, of the sulfonic acids prepared in accordance with this invention are, as mentioned above, useful as detergents, surfaceacting agents, wetting agents, thickeners, etc. Their improved color increases their usefulness, especially in household products.

The following examples are given to provide a better understanding of the process:

Example 1

Sulfur dioxide, oxygen, and cetane are fed continuously at room temperature into the bottom of a well-agitated two-liter (4″ diameter) cylindrical pressure vessel equipped with a 2″ turbine agitator, internal baffles, cooling coils, and temperature regulating equipment. The volume of liquid in the reactor is maintained at 440 cc. and pressure is kept at 60 p.s.i.g. Cetane is introduced at 29 cc./min. while $SO_2$ and $O_2$ are introduced at rates equivalent to 2250 and 450 cc. (STP)/min. respectively.

Gamma radiation to initiate the reaction is supplied by a 2200 curie cobalt 60 source. During the initiation period (10–15 minutes) no hydrocarbon is introduced, only gaseous reactants. When the reaction temperature rises to approximately 105° F. the temperature regulator controls the temperature at that point. Then hydrocarbon pumping is started.

When, or if, the reactor has been filled to the proper volume (440 cc.) a mixture of cetane, sulfonic acids and $SO_2$ begins to come out of the exit lines. This mixture rapidly turns black in color as it is depressured.

Then the water introduction is started. Water is injected continuously into the product removal lines at a point close to the reactor where the system is still under pressure. The quenched mixture is led to a point where pressure is removed and the sulfonic acid-hydrocarbon mixture separates. The amount of water introduced amounts to about 10 vol. percent of the hydrocarbon feed. When the quenching process is achieved correctly a pale yellow sulfonic acid solution separates from the hydrocarbon phase.

Example 2

Example 1 is repeated using cyclododecane as the feed.

Example 3

Example 1 is repeated using ultraviolet light supplied through a quartz window in the reaction vessel as the reaction initiator.

Example 4

Example 1 is repeated by continuously adding 0.05 part by weight of organic peroxide per part of hydrocarbon feed to the reaction mixture at a temperature of 150° F. as the sole initiator.

Example 5

As in Example 1 a sulfoxidation reaction is carried out in a continuous manner. The effluent stream from the reactor is oxygen poor, so the major portion of the reaction has stopped. At a point close to the reactor, n-hexane (or preferably neopentane), 25 vol. percent, is injected into and mixed with this effluent stream. This mixture is then depressured to 1 atmosphere where it should be quenched with water. It will turn dark in time, but not as rapidly as in Example 1.

Ionizing radiation having an energy of over 30 electron volts is the preferred method of initiating the reaction. The ionizing radiation to start the reaction can be obtained from X-ray and beta ray machines; from waste materials from nuclear reactors, such as spent fuel elements or portions thereof; from neutron reactors; and from artificially produced isotopes, such as cobalt 60. The reaction mixture can be exposed to the radiation in a straightforward manner, either batchwise or continuously, in a suitable container or conduit. When using a radioisotope, the reactants can be flowed in, or around the isotope in a plurality of streams. A suitable cobalt 60 gamma radiation source has been described by J. F. Black et al. in the "International Journal of Applied Radiation and Isotopes", Volume I, page 256 (1957). It is preferred to use electromagnetic radiation having a wave length in the range of $10^{-3}$ to $10^2$ A.

Neutron radiation will give the same basic reaction as electromagnetic radiation. A process based upon the use of neutron radiation is not, however, too desirable as it produces from the sulfur atom radioactive species of appreciable half-lives. A product containing such isotopes has little utility. Neutron irradiation can, however, be used to initiate the self-sustaining reaction and the radioactive material initially produced can be discarded.

The use of beta radiation from Van de Graaff generators or similar machines is also not too desirable as it leads to a high local concentration of heat. Further, it has been found that the reaction has a half-order dependency on dose rate, such that excessively high dose rates result in a poor utilization of the radiant energy. Such sources that give a localized high input can be used, somewhat inefficiently, to start the reaction if proper care is used. Beta radiation from radioactive materials so arranged as to avoid high dose rates may be conveniently employed.

The source of the radiation is preferably such that the dose rate used to start the reaction is in the range of 20 to $2 \times 10^5$, preferably $1 \times 10^3$ to $3 \times 10^3$, rads per minute, lower dose rates being preferred because of the half-order dependency of the reaction on dose rate.

It is to be understood that this invention is not limited to the specific examples, which have been offered merely as illustrations, and that modifications may be made without departing from the spirit of this invention.

What is claimed is:

1. In a method for producing sulfonic acids by reacting substantially straight chain hydrocarbons of about 12 to 24 carbon atoms per molecule with oxygen and sulfur dioxide in the liquid phase in a reaction zone at temperatures of about 70–150° F. at pressures of from about 20 to 300 p.s.i.g. for a sufficient time to convert about 5 to 50% of the hydrocarbon feed stocks into reaction products which include persulfonic acids, said reaction being initiated by a free radical producing means and thereafter proceeding quite readily in the absence of further initiation by the continuous addition of hydrocarbon feed, oxygen and sulfur to the persulfonic acid-containing reaction mixture in the reaction zone the improvement which comprises supplying oxygen and sulfur dioxide to the reaction zone in a molar ratio of from about 1:2 to about 1:10, the amount of sulfur dioxide supplied being more than that stoichiometrically necessary to sulfoxidize the hydrocarbon feed, withdrawing reaction mixture from the reaction zone, maintaining the withdrawn reaction mixture under essentially the same pressure as in the reaction zone to maintain excess sulfur dioxide in contact with the sulfoxidized feed, contacting the withdrawn sulfur dioxide-containing reaction mixture with a sufficient quantity of water to reduce substantially all of the persulfonic acids in said mixture to sulfonic acids and recovering sulfonic acids of light color from the reduced reaction mixture.

2. The method according to claim 1 in which the pressure is between about 40 and 100 p.s.i.g. and the reaction temperature is between 100 and 130° F.

3. The method according to claim 1 in which the withdrawn sulfur dioxide-containing reaction mixture is treated with water at a temperature of 50 to 105° F. to reduce the persulfonic acids to sulfonic acids.

(References on following page)

References Cited by the Examiner

UNITED STATES PATENTS 2,507,088    5/1950    Bradley _____ 260—513

FOREIGN PATENTS 831,095    2/1952    Germany.

OTHER REFERENCES

Bovey, Effects of Ionizing Radiation on Natural and Synthetic High Polymers, 1958, pp. 2, 14, 15, 41–44.

Doede et al., Chem. Eng., Volume 62, February 1955, pp. 162–163, 171.

Graf, Ann., Vol. 578, pp. 71, 73 (1952).

Houben-Weyl, Methoden der Organischen Chemie, Volume 9, 1955, pp. 366–367.

Manowitz, Nucleonics, Volume 11, October 1953, pp. 18–20.

Orthner, Angew. Chemie, Volume 62, 1950, pp. 302–305.

LORRAINE A. WEINBERGER, *Primary Examiner.*

LEON ZITVER, *Examiner.*

B. M. EISEN, M. WEBSTER, *Assistant Examiners.*